Nov. 13, 1962   A. STRUBLE ETAL   3,063,749
HEADREST COVER
Filed June 21, 1960
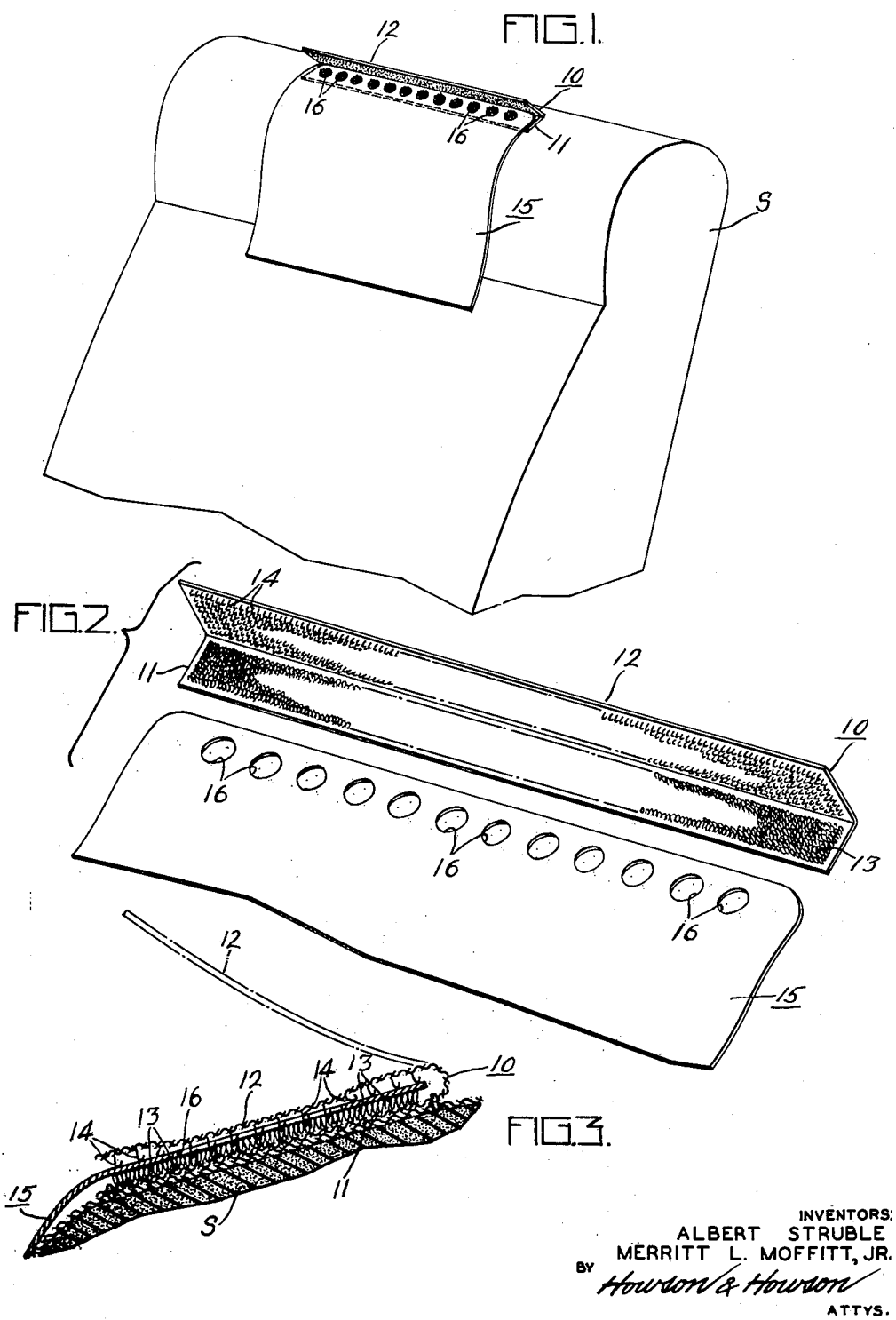
INVENTORS:
ALBERT STRUBLE
MERRITT L. MOFFITT, JR.
BY Howson & Howson
ATTYS.

United States Patent Office 3,063,749
Patented Nov. 13, 1962

3,063,749
HEADREST COVER
Albert Struble, 508 Irvington Road, Drexel Hill, Pa., and Merritt L. Moffitt, Jr., 9 Weirwood Road, Radnor, Pa.
Filed June 21, 1960, Ser. No. 37,626
1 Claim. (Cl. 297—220)

The present invention relates to new and useful improvements in seat headrest covers for the back of a seat or chair and more particularly to new and useful improvements in disposable headrest covers which may be readily attached to and detached from a seat or the like.

Prior to the present invention disposable headrest covers of this type normally were fastened to the seat by means of snap fasteners, buttons or the like and normally provisions have been made for incorporating a part of the fastener in the disposable headrest cover. Covers of this type are not readily attachable and detachable, and also, by incorporating a portion of the fastener in the headrest cover the cost of the cover is increased.

With the foregoing in mind a primary object of the present invention is to provide a novel disposable headrest cover for a seat or the like together with novel fastening means wherein the entire fastening means are secured to the seat or similar member and the headrest cover may be readily attached to or removed from the fastening means.

Another object of the present invention is to provide a novel disposable headrest cover which may be manufactured easily and cheaply and is entirely efficient and effective in use.

These and other objects of the present invention and the various features and details of the operation and construction thereof are hereinafter more fully set forth and described with reference to the accompanying drawings, in which:

FIG. 1 is a perspective view of a portion of the back of the seat having a disposable headrest cover made in accordance with the present invention positioned thereon;

FIG. 2 is an exploded fragmentary sectional view illustrating the upper portion of the headrest cover of the present invention and the fastening means for the cover; and FIG. 3 is an enlarged fragmentary transverse sectional view illustrating the headrest cover fastening member and headrest cover in position on the back of a seat.

Referring more specifically to the drawings, there is illustrated a portion of the back of a seat S having a fastening member 10 secured thereto which is adapted to receive and support a disposable headrest cover 15 in position on the back of the seat. The headrest fastening member 10 comprises an elongated strip of flexible fabric folded lengthwise along its central axis to provide a lower flap 11 which is adapted to be permanently secured to the back of the seat S, for example, by stitching or other fastening means illustrated in FIG. 3, and an upper flap 12 which is free of the seat and may be folded up or down as desired to maintain the headrest cover in position and permit removal of the headrest cover. The flaps 11 and 12 are adapted to be secured to one another in overlying relation and to this end pressure locked fastening means is provided in the form of fastener strips at 13 and 14, respectively. The fastener strips 13 and 14 are complementary and when pressed into engagement are highly resisted to separation by a shearing force and a plane of engagement of the fastener strips 13 and 14. However, the material may be readily separated by forces exerted in a plane perpendicular to the plane of engagement, for example, by peeling one flap 12 away from the other flap 11.

In the present instance, the fastening strips 13 and 14 are composed of "Velcro" material. The fastening strip 13 comprises a base material having a irregular loose looped pile randomly formed thereon whereas the fastening strip 14 comprises a base material having a plurality of closely spaced upstanding hooks formed of a resilient flexible material. When the strips 13 and 14 are pressed into face to face engagement, the hooks engage into the pile and a close spacing of the hooks prevent substantial flexing when subjected to shearing forces in the plane of engagement. However, when the material is subjected to a force perpendicular to this plane, the flexible nature of the hooks enables ready disengagement of the hooks from the pile.

In accordance with the present invention the disposable headrest cover 15 is made of paper or other flexible material which may be thrown away after use and has a plurality of openings 16 along the upper edge thereof. The upper edge of the disposable headrest cover is adapted to be positioned between the lower and upper flaps 11 and 12 of the fastening member 10, for example, as illustrated in FIGS. 1 and 3 and the upper flap thereafter is adapted to be pressed downwardly causing the hooks of the fastening strips 14 to pass through the opening 16 into engagement with the pile of the fastening strip 13 to thereby hold the disposable headrest cover in place on the back of the seat. In this connection, to provide a maximum holding force the openings 16 should be made as large as possible so that a substantial number of the hooks of the fastening strips 13 may be passed through the opening. In order to remove the headrest cover 15 from the back of the seat all that is necessary is to grip the upper flap 12 and raise the flap to its open position, for example, as shown in broken lines in FIG. 3, thereby disengaging the hooks of the fastening strip 14 from the pile of the fastening strip 13.

From the foregoing it will be observed that the present invention provides a novel headrest cover and fastening means therefor which permits ready removal and replacement of the headrest cover and in which the disposable headrest cover may be made with a minimum of expense.

While a particular embodiment of the present invention has been illustrated and described herein, it is not intended to limit the invention to such a disclosure and changes and modifications may be incorporated and embodied therein within the scope of the following claim.

We claim:

A headrest cover for the back rest of a chair comprising; a first flexible fastening strip, means securing said first flexible fastening strip to the back rest of said chair in a direction extending crosswise of said chair back rest, a second flexible fastening strip formed integrally with said first flexible fastening strip and interconnected with said first flexible fastening strip along a fold line at the top of said first flexible fastening strip, said second flexible fastening strip adapted to be folded downwardly to a position co-extensive with and overlying said first flexible fastening strip, a cover member formed of flexible material having one edge portion thereof overlying said first flexible fastening member, means defining a plurality of openings in said cover member spaced apart along one edge thereof, said one edge of said cover member including said openings adapted to be positioned in overlying engagement with said first fastening strip, and pressure-locking fastening means on the confronting faces of said first and second fastening strips covering the entire area thereof and composed of a series of looped piles randomly formed on one of said fastening strips and closely spaced hooks formed on the other of said fastening strips, said pressure-locking fastening means on said first and second fastening strips operable to engage each other through said openings in said cover member and detachably interlock in the area of said openings to secure said cover member in position on the back rest of said chair.

References Cited in the file of this patent

UNITED STATES PATENTS

| | | | |
|---|---|---|---|
| 735,453 | Bliven | Aug. 4, | 1903 |
| 826,954 | Mueller | July 24, | 1906 |
| 936,030 | Pfanschmidt | Oct. 5, | 1909 |
| 1,046,798 | Jones | Dec. 10, | 1912 |
| 1,062,931 | Salmon | May 27, | 1913 |
| 1,237,660 | Lakin | Aug. 21, | 1917 |
| 1,542,561 | Laskin et al. | June 16, | 1925 |
| 2,080,734 | Mull | May 18, | 1937 |
| 2,717,437 | De Mestral | Sept. 13, | 1955 |
| 2,820,277 | Forester | Jan. 21, | 1958 |
| 2,856,660 | Twohig | Oct. 21, | 1958 |
| 2,863,164 | Schesvold | Dec. 9, | 1958 |
| 2,902,734 | Walters | Sept. 8, | 1959 |

FOREIGN PATENTS

| | | | |
|---|---|---|---|
| 8,051 | Sweden | Apr. 7, | 1897 |
| 682,855 | Great Britain | Nov. 19, | 1952 |